United States Patent
Fiammante

[19]

[11] Patent Number: 6,081,532
[45] Date of Patent: Jun. 27, 2000

[54] BRIDGING APPARATUS FOR TRAFFIC FILTERING IN COMMUNICATION NETWORKS

[75] Inventor: Marc Fiammante, St Laurent du Var, France

[73] Assignee: International Business Machines Corporation, Armonk, N.Y.

[21] Appl. No.: 08/733,488

[22] Filed: Oct. 18, 1996

[30] Foreign Application Priority Data

Oct. 20, 1995 [EP] European Pat. Off. .............. 95480159

[51] Int. Cl.[7] .............................. H04L 12/28; H04L 12/54
[52] U.S. Cl. ............................................ 370/401; 370/428
[58] Field of Search ................................. 370/312, 401, 370/402, 233, 229, 231, 235, 236, 412, 428, 429, 432, 413, 419; 395/183.15, 200.5, 200.8, 200.15–200.48, 200.81

[56] References Cited

U.S. PATENT DOCUMENTS

| | | | |
|---|---|---|---|
| 4,947,390 | 8/1990 | Saheehy ................................. | 370/401 |
| 5,530,703 | 6/1996 | Liu et al. ............................... | 370/402 |
| 5,560,038 | 9/1996 | Haddock ............................ | 395/200.17 |
| 5,570,366 | 10/1996 | Baker et al. ............................. | 370/312 |
| 5,604,867 | 2/1997 | Harwood ............................ | 395/200.63 |
| 5,608,726 | 3/1997 | Virgile ................................. | 370/401 |
| 5,610,905 | 3/1997 | Murthy et al. .......................... | 370/401 |
| 5,729,680 | 3/1998 | Belanger ................................ | 370/436 |
| 5,758,070 | 5/1998 | Lawrence ............................ | 395/200.5 |

FOREIGN PATENT DOCUMENTS

| | | | |
|---|---|---|---|
| 0365337 | 4/1990 | European Pat. Off. ........ | H04L 12/46 |
| 9408412 | 4/1994 | WIPO ............................ | H04L 12/46 |
| 9418768 | 8/1994 | WIPO ............................ | H04L 12/18 |

*Primary Examiner*—Chau Nguyen
*Assistant Examiner*—Chiho Andrew Lee
*Attorney, Agent, or Firm*—Joscelyn G. Cockburn

[57] ABSTRACT

A bridging apparatus for receiving and transmitting broadcast and non-broadcast frames from a first communication network to a second communication network in a network system, is provided. The bridging apparatus includes storage memory for storing the broadcast frames and the non-broadcast frames, and filtering arrangement for controlling and balancing the transmission of the frames to the second communication network. The filtering is performed by alternatively reading and sending a first number of broadcast frames and a second number of non-broadcast frames to the second communication network. The number of broadcast frames and non-broadcast frames being read and send alternatively is based upon the characteristics of the communication networks.

The bridging system of the invention further permits to discard either broadcast frames or non-broadcast frames that are received from a first network, when the capacity of the memory in which each type of frame is stored is reached.

The system disclosed also permits that a broadcast frame received from a same station may be discarded if it is received within a variable delay. This delay may be defined with respect to the characteristics of the networks, or may be dynamically computed with respect to the time at which the last broadcast frame received from the same station has not been successfully transmitted to the second network.

12 Claims, 4 Drawing Sheets

BRIDGING APPARATUS FOR TRAFFIC FILTERING IN COMMUNICATION NETWORKS

TECHNICAL FIELD

The present invention relates to computer communication systems, and more precisely to traffic filtering on computer communication systems.

BACKGROUND ART

In communication systems, the technique used to prevent unuseful traffic to use communication system resources is filtering. On large local area networks, a significant part of the traffic is a repetitive or informative traffic intended for all stations, known as broadcast traffic. This type of traffic is used to locate, update or give information about network resources. For example, a station connected to a network sends broadcast frames in order to obtain the physical address of a station connected to a different network. Generally this broadcast frame is sent several times to be sure that it will be received. Most of this broadcast traffic is unuseful and can be filtered and discarded to increase efficient data throughput, provided some means ensure that its functionality is fulfilled.

The typical problems in the prior art solutions are generally that the broadcast frames are held until a media becomes available. This solution does not balance the traffic and may cause some connection lost when bridging to a media of a low speed.

In other known systems, filtering is static which means that a table containing the types of broadcast frames not to be discarded, has to be maintained. This solution implies to stop the communication system when updating the table.

In the IBM® infrared wireless LAN, wherein mobile stations are connected to low speed infrared LAN, all the broadcast frames from high speed network are filtered until a mobile station sends a broadcast request.

SUMMARY OF THE INVENTION

Therefore, it is an object of this invention to provide a method and apparatus for achieving a dynamic and protocol independent filtering in a bridge connecting communication networks, ensuring that the mandatory broadcast information is transmitted to the networks through the bridge.

It is another object of the invention to provide such a method and apparatus wherein the filtering ensuring that all the broadcast information is equitably treated whatever is the frequency at which the broadcast information is transmitted.

In a preferred embodiment, a bridging apparatus for receiving and transmitting broadcast and non-broadcast frames from a first communication network to a second communication network in a network system, is provided. The bridging apparatus comprises storage means for storing the broadcast frames and the non-broadcast frames, and filtering means for controlling and balancing the transmission of the frames to the second communication network. The filtering is first performed by reading from the storage means and sending to the second network, alternatively a first number of broadcast frames and a second number of non-broadcast frames. The choice of the number of broadcast frames and non-broadcast frames being read and send alternatively is based upon the characteristics of the communication networks, and may be of a different value.

In another embodiment, the broadcast frames and the non-broadcast frames are stored in different storage areas, of different memory capacity. The capacity of the storage area of the broadcast frames being preferably a quarter of the capacity of the storage area of the non-broadcast frames.

It is another object of the invention to provide such a method and apparatus wherein the filtering ensuring that all the broadcast information is equitably treated whatever is the frequency at which the broadcast information is transmitted.

In yet another embodiment, the bridging system of the invention further comprises discarded means for discarding either the broadcast frames or the non-broadcast frames that are received from a first network, when the capacity of the memory in which each type of frame is stored is reached.

In another embodiment, the broadcast frames that are received from a same station may also be discarded if they are received within a variable delay. This delay may be defined with respect to the characteristics of the networks, or may be dynamically computed with respect to the time at which the last broadcast frame received from the same station has not been successfully transmitted to the second network.

DETAILED DESCRIPTION OF THE INVENTION

Figure 1:
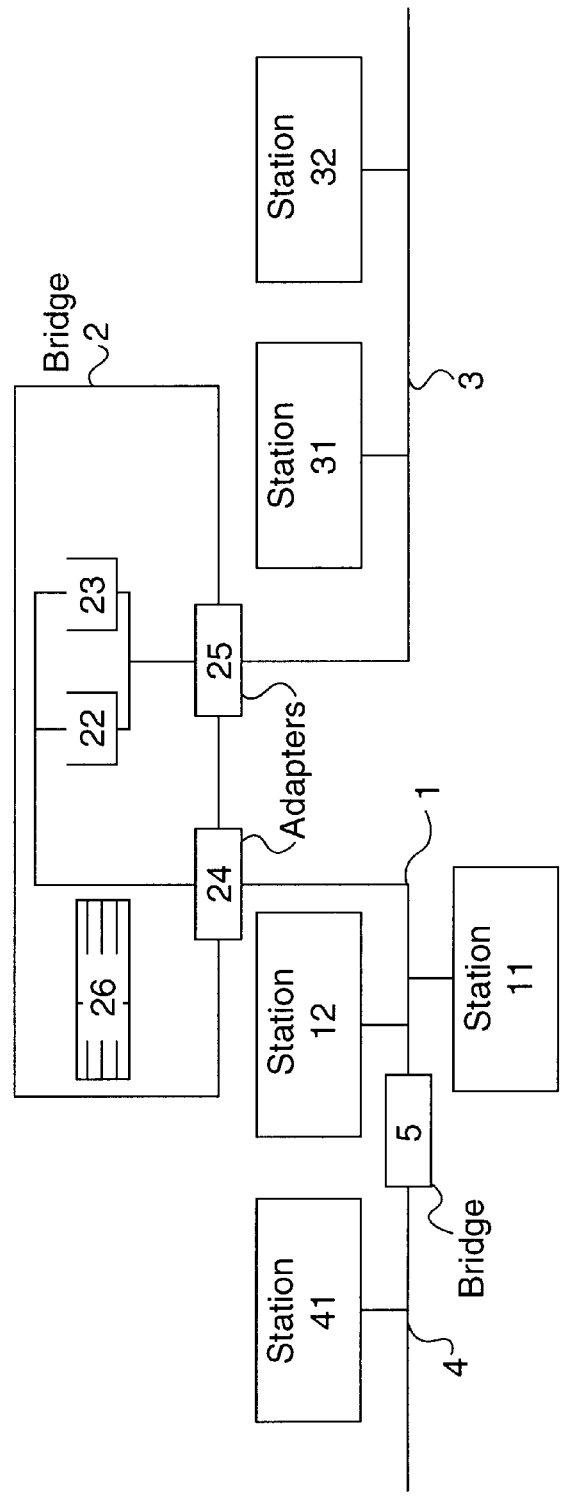
FIG. 1 shows a pictorial diagram of a bridge connecting local area network sysems in which the invention is implemented.

Referring now to the drawings, and more particularly to FIG. 1, a bridging system (2) allowing communication between local or wide area networks (1, 3, 4) is shown. The local or wide area networks typically include one or more stations (11, 12, 31, 32, 41) on each network. The bridge station (2) may be a processor comprising network adapters (24, 25) for interfacing network (1) with network (3). Also shown on FIG. 1, is another bridge station (5) which can be the same type as the bridge station of the invention, and connecting network (1) to network (4). In alternate configuration, each local or wide are network can be bridged by such bridge station to other local or wide area networks (not represented on the drawing). The number of stations connected to a single local area network is typically high (tens, hundreds or more) but a simplified implementation is represented on FIG. 1.

The filtering operation which is more detailed hereinafter, is described for a communication running from network (1) to network (3), but can be implemented for a traffic running from network (3) to network (1) or to any other network (4) connected to network (1) by bridge stations (5). The bridge station (2) further comprises memory blocks (22, 23). The input of memory block (22) is connected to the output of the network adapter (24), while the output of memory block (22) is connected to the input of the network adapter (25). The input of memory block (23) is connected to the output of the network adapter (24) while the output of memory block (23) is connected to the input of the adapter (25). A hash table (26) is also implemented in the bridging system (2), in which the processor constituting bridge (2) stores the source address of the received broadcast frames and the current time of their reception. It will now be described in more detail how bridge (2) operates to implement the dynamic filtering function according to the present invention, in order to prevent saturating network (3) with broadcast frames while maintaining a reduced flow of these broadcast frames.

According to the invention, the traffic from network (1) is split into the two queues (22, 23). Typically queue (22) contains the non-broadcast traffic and queue (23) contains the broadcast traffic. These traffics being differentiated by examining the bit indicating the type of frame which in most protocols is located in the Destination Address field as shown on the different example below:

Token Ring (802.5) Frame medium access control (MAC) header:

| SB | AC | FC | DA | SA | RI |
|---|---|---|---|---|---|

SB: Start Byte (8 bits)
AC: Access control Byte (8 bits)
FC: Frame control (8 bits)
DA: Destination Address (48 bits). The most significant bit (MSB) of first octet is set to 1 for a broadcast address, otherwise 0.
SA: Source Address (48 bits)
RI: Routing information (0 to 160 bits)

Ethernet V2.0 or 802.3 Frame medium access control (MAC) header:

| Preamble | SD | DA | SA |
|---|---|---|---|

Preamble: preamble (56 bits)
SD: Start Delimiter (8 bits)
DA: Destination Address (48 bits). The most significant bit (MSB) of first octet is set to 1 for a broadcast address, otherwise 0.
SA: Source Address (48 bits)

FDDI Frame medium access control (MAC) header:

| XX | DA | SA |
|---|---|---| xx: Control Byte (8 bits)
DA: Destination Address (48 bits). The most significant bit (MSB) of first octet is set to 1 for a broadcast address, otherwise 0.
SA: Source Address (48 bits)

In the preferred embodiment of the invention, the storing capacity of memory queue (23) is less than the one of memory queue (22). The preferred ratio being 1 to 4. If a queue is full when a frame should be enqueued the frame is discarded. The communication protocol at the Link layer ensures in a conventional way the reliablity for discarded non-broadcast frames, while the reliability for discarded broadcast frames is ensured according to the subject invention.

In yet the preferred embodiment of the invention, the content of queues (22, 23) is output in turn to transfer a frame on network 3, ensuring a balancing between the non-broadcast queue (22) and the broadcast queue (23) even if a filling rate is higher for one of the queues, typically the broadcast one. The balancing frequency may be adjusted according to different criteria, such as the network speed or the content of the traffic. The preferred balancing ratio being 1 to 1.

In a further embodiment, bridge (2) ensures that all broadcast frames received from any station connected on network (1) or on any network connected by bridges to network (1), are treated equitably. Referring to FIG. 1, stations (11, 12, 41) can emit broadcast frames. In case queue (23) is overflowing which means that there is no available area to store newly broadcast frames which have to be discarded, each new received broadcast frame is examined in the bridge (2) through its Source Address as previously defined and its current time of their reception (which may be obtained from the operating system of bridge station (2)), and compared to the content of a hash table (26) storing the Source Address and current time of previous discarded broadcast frames. A delay is continuously computed to define the time at which a broadcast frame with the same Source Address as a previously discarded broadcast frame may be queued in queue (23).

Figure 2:
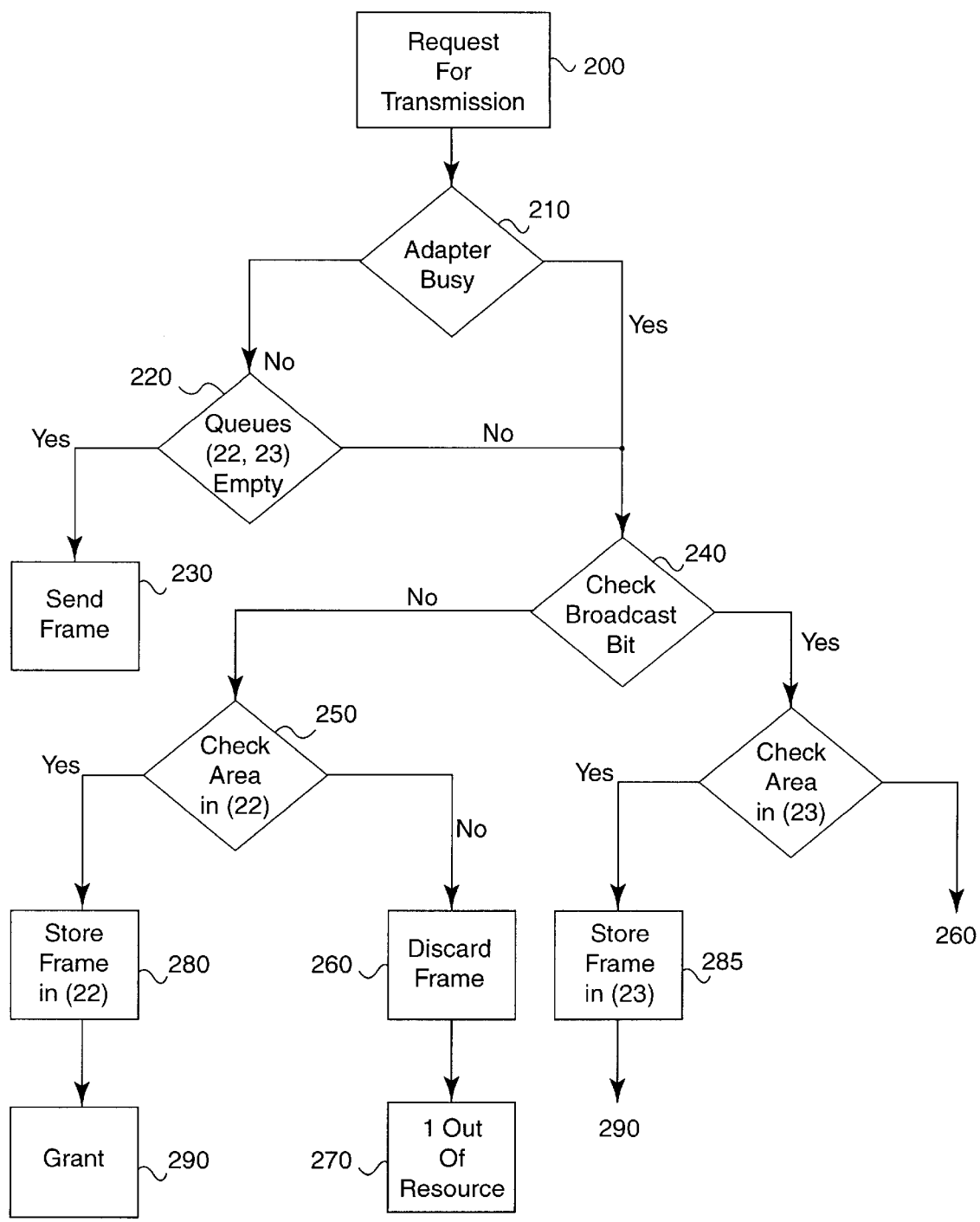
FIG. 2 shows the flow chart of the enqueueing function implemented in the bridge of the invention.

Referring to FIG. 2, wherein the first part of the dynamic filtering function is shown from step 200 to step 290, the enqueueing of the broadcast and non-broadcast frames in the two memory queues (22, 23) is now described. It is assumed that before first step 200, a frame sent from a station connected directly to or bridged to network (1), is processed into bridge (2) with a handling method well-known for a man skilled in the art. If the result of the processing is to forward the frame to the network adapter 25 then first step 200 of the method of the invention is a request for transmission to network adapter (25). On step 210, adapter (25) is checked. If the adapter is busy, next step is 240. If adapter (25) is not busy (branch NO), step 220 is performed to check if the two memory queues (22, 23) are empty. If both of the queues are empty (branch YES), the frame is transmit to network (3) on step 230. If one of the queue is not empty (branch NO) next step 240 is to check the value of the broadcast bit in the Destination Address field of the frame header, as previously defined.

If the bit is set to a value defining a non-broadcast frame, (branch NO), then memory (22) is tested on step 250, to find if there is room available. In case of free area (branch YES), the frame is stored (enqueued) in the memory queue (22) on step 280, and a grant signal is sent back to adapter (24) on step 290 in response to the initial request.

If there is no available area in non-broadcast memory (22), the frame is discarded on next step 260, and an "out of resource" signal is sent back to adapter (24), on step 270 to refuse the initial request.

If the broadcast bit is set to a value defining a broadcast frame (branch YES), then memory (23) is tested on step 255 to find if there is room available. In case of free area (branch YES), the frame is stored (enqueued) in the memory queue (23), on step 285, and next step 290 is performed. If there is no available area in broadcast memory (23), the frame is discarded (step 260), and step 270 is performed.

Figure 3:
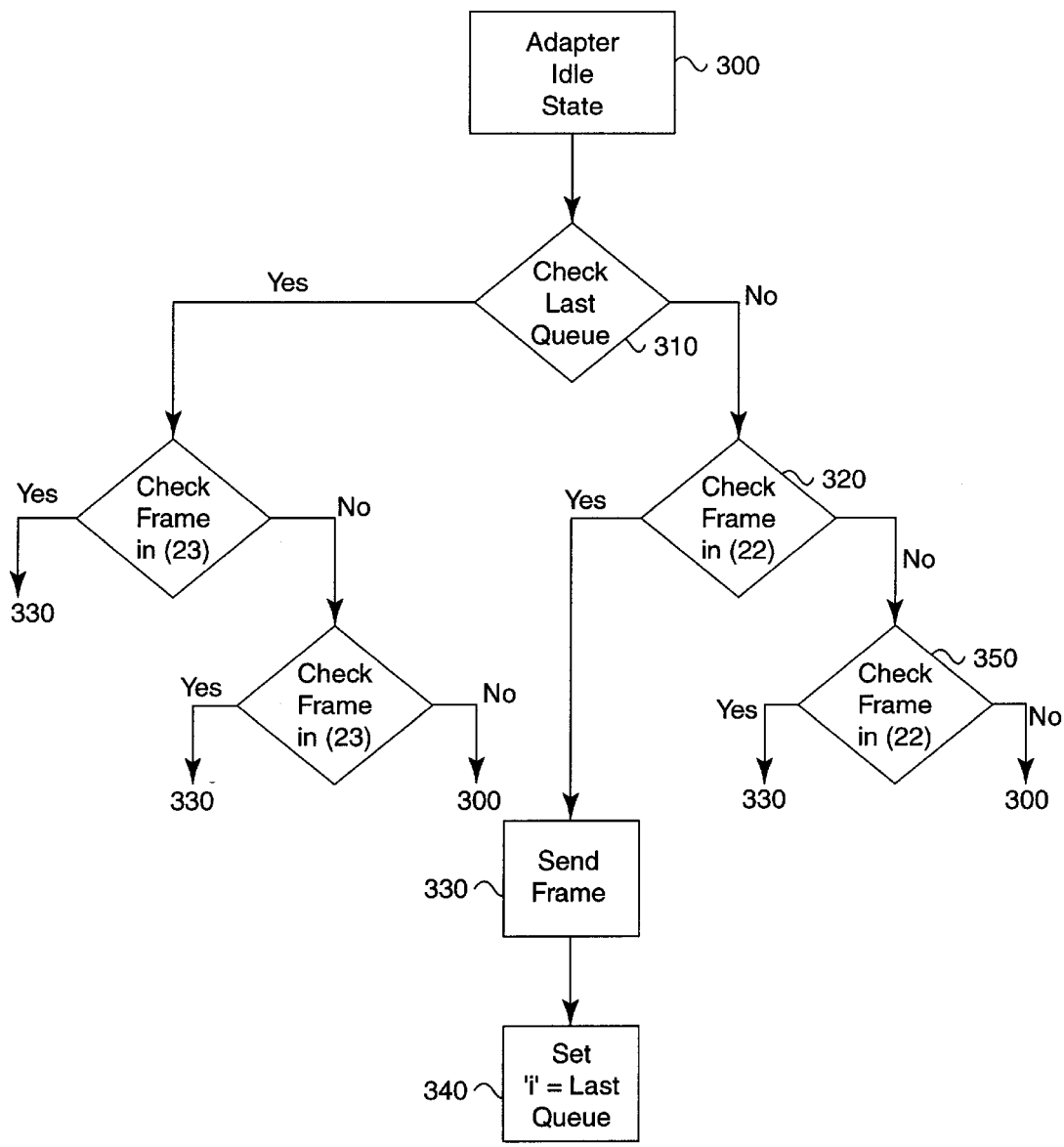
FIG. 3 shows the flow chart of the dequeueing function implemented in the bridge of the invention.

Referring now to FIG. 3, the dequeueing function begins on step 300 with adapter (25) being on an IDLE state ready for a new transmitting operation. On step 310, a test is performed to determined which of the two memory queues has to be checked with respect to the last check.

If non-broadcast queue (22) is to be checked first (branch NO), next step 320 is to verify if a frame is enqueued in memory (22). If the result of the test is YES, then the frame is transmitted on step 330, and indicator "i" is set to the non-broadcast value on step 340, meaning that the last queue checked is the non-broadcast one. If the result of the test is NO, then step 350 is performed, wherein broadcast memory queue (23) is checked to verify if a frame is enqueued. If the result of the test is YES, then the following iteration is step 330, otherwise with a test result of NO, the next step is 300.

If broadcast queue (23) is to be checked first (branch YES of test 310), next step 370 is to verify if a frame is enqueued in the memory (23). If the result of the test is YES, then steps 330 and 340 are accomplished. If the result of the test is NO, then step 380 is performed, wherein non-broadcast memory queue (22) is checked to verify if a frame is enqueued. If the result of the test is YES, then the following iteration is step 330, otherwise with a test result of NO, the next step is 300.

In the preferred embodiment of the invention, the filtering method is a software implementation in the bridge program of the processor of bridge (2), but can be part of the network adapter (25) with ordinary adaptation for a man skilled in the art.

Figure 4:
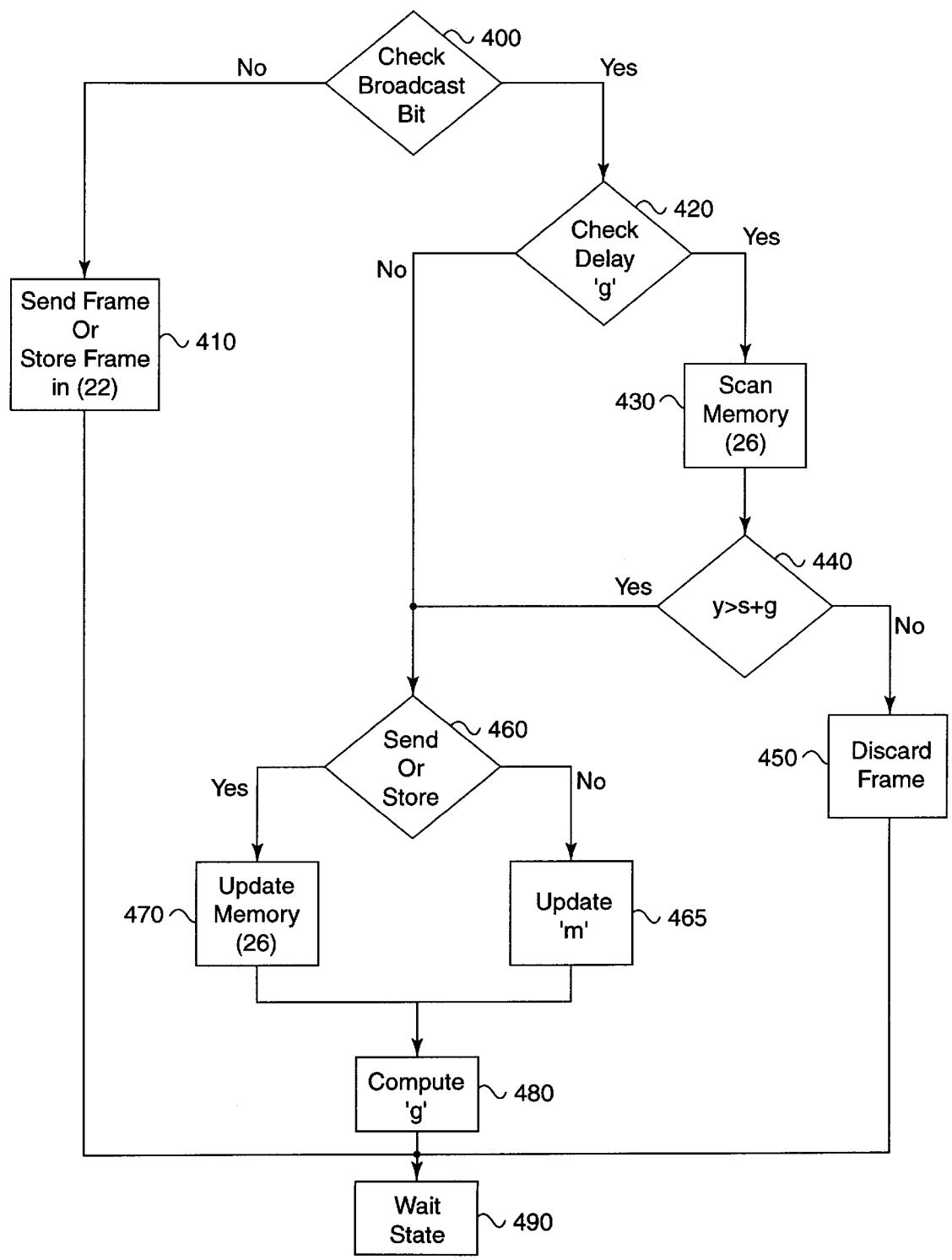
FIG. 4 shows the flow chart of the discarding function implemented in the bridge of the invention.

Referring to FIG. 4, wherein an additional part of the dynamic filtering function is shown from step 400 to step 490, the filtering of the broadcast frames bases on their issues is now described.

It is assumed that before first step 400, a frame sent from a station connected directly to or bridged to network (1), is processed into bridge (2) with a handling method well-known for a man skilled in the art. If the result of the processing is to forward the frame to the network adapter (25) then first step 400 of the method of the invention is to check the broadcast bit in the Destination Address field of the frame header.

If the bit is set to a value defining a non-broadcast frame (branch NO), then on step 410 the frame is transmitted to network (3) directly if queue (22) is empty, otherwise the frame is enqueued (in storage memory 22). Next, step 490 is performed.

If the bit is set to a value defining a broadcast frame branch (YES), step 420 is performed, in which a global delay 'g' is tested. This delay 3 g' set to 0 when power-on, indicates a minimum time to observe before allowing any broadcast frame from a given source station to be transmitted. If the value of 3 g' is 0 (branch NO), step 460 is performed. If the value of 3 g' is greater then 0 (branch YES), step 430 is performed. On step 430, a memory (26) is looked up for searching the last time 's' a frame from the same Source Address was successfully sent to the adapter. Then step 440 is performed. Memory (26) is scanned using a fast access method such as the so-called hashing method.

In step 440, the current time 'Y' of the processing system is read and compared to the sum of the last time 's' plus the global delay 3 g'. If the current broadcast frame is received too early compared to previous broadcast frame from the same source ('Y' is less than 's+g' or branch NO) then step 450 is performed. On Step 450 the frame is discarded and step 490 is performed.

If the current time 'Y' is greater than 's+g', step 460 is performed, wherein the operation is to try to transmit directly the frame to network (3) or stored it in memory (23).

If the transmission or enqueueing is successful (branch YES) step 470 is performed. In step 470, a field in memory (26) (the same Source Address field than the frame sent) is updated with the current time from the processing system, and the number 'n' of unsuccessful broadcast transmissions during the last trials is updated accordingly. Then Step 480 is performed.

If the transmission and the enqueuing could not be performed (branch NO) then step 465 is performed, wherein the number 'n' of unsuccessful broadcast transmissions is updated accordingly. Then Step 480 is performed.

In step 480 the global delay 3 g' for next broadcast transmission is computed. In a preferred implementation, the value of 3 g' is proportional to the number of unsuccessful broadcast transmissions 'n'. Then final step 490 is performed, wherein network adapter (24) will process new incoming frames.

Others aspects and advantages of the present invention are listed below:

The solution is Link Layers protocol independent and can be used for any type of Link Layers traffic such as Netbios, TCP/IP, 802.2 IPX etc . . .

The present invention allows searching for a resource by mean of broadcast traffic beyond the filtering bridge; it also allows the resource beyond the filtering bridge to identify (with known method of high level protocols), the resources located on the other side of the bridge, while reducing the overall traffic on the network.

The method described is preferably implemented for reducing the flow of broadcast frames from a wired backbone to a wireless network, but those skilled in the art will recognize that the invention can be practiced in other applications wherein a filtering function is needed.

What is claimed is:

1. In a network system comprising:
   at least a first and a second Communication Networks (1, 3) having a plurality of attached stations (11, 12, 31, 32),
   a bridging apparatus (2) that receives and transmis broadcast and non-broadcast frames from said first network (1) to said second network (3);
said bridging apparatus (2) including:
   storage (22, 23) including a first section in which broadcast frames received from the first network are being stored and a second section in which non-broadcast frames received from said first network are being stored;
   discard circuit for discarding said broadcast frames received from a station within a variable delay, said variable delay being defined with respect to a current time of the last broadcast frame received from said station: and
   filtering arrangement for controlling and balancing transmission of said frames to said second network, said filtering arrangement reading from said first section and sending to the second network a first number of broadcast frames and from said second section a second number of non-broadcast frames wherein transmissions are being alternated between the first number of broadcast frames and the second number of non-broadcast frames.

2. The bridging apparatus of claimsl wherein said first number is different than said second number.

3. In a network system comprising:
   at least a first and a second Communication Networks (1, 3) having a plurality of attached stations (11, 12, 31, 32);
   a bridging apparatus (2) comprising circuits for receiving and transmitting broadcast and non-broadcast frames from said first network (1) to said second network (3);
said bridging apparatus (2) including:
   storage (22, 23) including a first area in which broadcast frames received from the first network are being stored and a second area in which non-broadcast frames received from said first network are being stored wherein the capacity of said first area is different from the capacity of said second area;

discard circuit for discarding said broadcast frames received from a station within a variable delay, said variable delay being defined with respect to a current time of the last broadcast frame received from said station; and filtering arrangement for controlling and balancing transmission of said frames to said second network, said filtering arrangement reading from said first area and sending to the second network a first number of broadcast frames and from said second area a second number of non-broadcast frames wherein transmissions are being alternated between the first number of broadcast frames and the second number of non-broadcast frames.

4. The bridging apparatus of claim 3 wherein the capacity of said first area is a quarter of the capacity of said second area.

5. The bridging apparatus of claim 1 further comprising first discarded means for discarding said broadcast and non-broadcast frames received from said first network when the capacity of said storage means is reached.

6. The bridging apparatus of claim 1 further comprising memory for storing the current time at which said broadcast frames are received from a common station of said first network.

7. In a network system comprising:

at least a first and a second Communication Networks (1, 3) having a plurality of attached stations (11, 12, 31, 32), a bridging apparatus (2) comprising means for receiving and transmitting broadcast and non-broadcast frames from said first network (1) to said second network (3);

said bridging apparatus (2) including:

memory for storing the current time at which said broadcast frames are received from a common station of said first network;

discard means for discarding said broadcast frames received from said common station within a variable delay, said variable delay being defined with respect to the current time of the last broadcast frame received from said common station, storage (22, 23) for storing broadcast and non-broadcast frames receives from said first network (1);

filtering arrangement for controlling and balancing transmission of said frames to said second network, said filtering arrangement reading from said storage and sending to the second network a first number of broadcast frames and a second number of non-broadcast frames wherein transmissions are being alternated between the first number of broadcast frames and the second number of non-broadcast frames and said first and second numbers being selected according to the characteristics of said first and second network.

8. A bridging apparatus of claiim 6 wherein said memory for storing the current time comprises a hash table.

9. The method of claim 8 further including the step of generating a table including source addresses of received broadcast frames and current time of reception for each source address listed in said table.

10. A method for filtering frames within a communications network including at least a first communications network and a second communications network coupled by at least one interconnecting device, said method including the steps of:

(a) providing, in a memory, a first queue for storing broadcast frames and a second queue for storing non-broadcast frames;

(a1) generating a hash table including source addresses of received broadcast frames and current time of reception for each source address listed in said table;

(b) receiving frames;

(c) identifying received frames as broadcast or non-broadcast frames;

routing broadcast frames to the first queue and non-broadcast frames to the second queue;

discarding said broadcast frames received from a first station within a variable delay, said variable delay being defined with respect to the current time of the last broadcast frame received from said first station; and transmitting a first number of broadcast frames from the first queue and a second number of non-broadcast frames from the second queue wherein transmission of broadcast frames and non-broadcast frames are being alternated between the first queue and the second queue.

11. A method for filtering frames within a communications network including at least a first communicatons network having a plurality of attached stations, a second comnunication network having a plurality of attached stations, and at least one device interconnecting the first communications network and the second communications network said method including the step of:

(a) providing, in a memory, a first queue that stores broadcast frames received from the first communications network to be forwarded to the second communications network and a second queue that stores non-broadcast frames received from the first communications network to be forwarded to the second communications network;

(b) receiving frames from said first communications network;

(c) identifying receiving frames as broadcast frames or non-broadcast frames; routing broadcast frames to the first queue and non-broadcast frames to the second queue;

transmitting to the second communications network, a first number of broadcast frames from the first queue and a second number of non-broadcast frames from the second gueue wherein transmission of broadcast frames and non-broadcast frames are being alternated between the first queue and the second queue and the first number and the second number are of different values;

generating a table including source addresses of received broadcast frames and current time of reception for each source address listed in said table;

monitoring the queues and if the first queue is full;

selectively deleting items in the first queue;

for broadcast frames received thereafter, correlating the source address and current time of reception with like entry in the table; and enqueueing in the firt queue, only frames in which the difference between the current time of receipt and recorded time in the table falls within a predetemined range.

12. The bridging apparatus of claim 1 wherein said first and second numbers are being selected according to the characteristics of said first and second networks.

* * * * *